US012703528B2

(12) United States Patent
Scheuber et al.

(10) Patent No.: US 12,703,528 B2
(45) Date of Patent: Aug. 11, 2026

(54) REFILLING STATION FOR DISPENSER CAN WITH TRANSPONDER READER AND DISPENSER CAN TRANSPONDER

(71) Applicant: WÜRTH INTERNATIONAL AG, Chur (CH)

(72) Inventors: Michael Scheuber, Langenbrettach (DE); Herbert Reuther, Krautheim (DE)

(73) Assignee: WÜRTH INTERNATIONAL AG, Chur (CH)

( * ) Notice: Subject to any disclaimer, the term of this patent is extended or adjusted under 35 U.S.C. 154(b) by 45 days.

(21) Appl. No.: 18/566,370

(22) PCT Filed: May 4, 2022

(86) PCT No.: PCT/EP2022/061905
§ 371 (c)(1),
(2) Date: Dec. 1, 2023

(87) PCT Pub. No.: WO2022/253511
PCT Pub. Date: Dec. 8, 2022

(65) Prior Publication Data
US 2024/0246707 A1 Jul. 25, 2024

(30) Foreign Application Priority Data
Jun. 2, 2021 (DE) ..................... 10 2021 114 319.5

(51) Int. Cl.
*B65D 83/42* (2006.01)
*B65B 31/00* (2006.01)
(Continued)

(52) U.S. Cl.
CPC .......... *B65B 31/003* (2013.01); *B67D 3/0006* (2013.01); *G06K 7/10366* (2013.01);
(Continued)

(58) Field of Classification Search
CPC ...... B65B 31/003; B67D 3/003; B67D 3/006; B67D 3/0093; B65D 83/42; G07F 7/0609; G07F 13/04; G06K 7/10366
See application file for complete search history.

(56) References Cited

U.S. PATENT DOCUMENTS 7,152,781 B2 * 12/2006 O'Dougherty ..... G05B 19/0425 235/375
8,151,835 B2 * 4/2012 Khan ...................... B65B 3/003 141/315
(Continued)

FOREIGN PATENT DOCUMENTS

EP 3795535 A1 * 3/2021 ........... B67D 1/0801
JP 2006039656 A 2/2006
(Continued)

OTHER PUBLICATIONS

German Search Report of DE 10 2021 114 319.5, Dec. 16, 2021, 8 pages.
(Continued)

*Primary Examiner* — Nicolas A Arnett
(74) *Attorney, Agent, or Firm* — Womble Bond Dickinson (US) LLP

(57) ABSTRACT

A refilling station comprises a receiving device for receiving a dispenser can to be refilled with an active ingredient, a transponder reader for selectively reading dispenser can-related data of a dispenser can transponder attached to the dispenser can when the dispenser can is attached to the receiving device, and a control device for controlling refilling of the dispenser can with the active ingredient based on the read dispenser can data, when the dispenser can is attached to the receiving device.

8 Claims, 6 Drawing Sheets

(51) Int. Cl.

| | |
|---|---|
| ***B67D 3/00*** | (2006.01) |
| ***G06K 7/10*** | (2006.01) |
| ***G07F 13/04*** | (2006.01) |
| *B05B 7/04* | (2006.01) |
| *G07F 7/06* | (2006.01) |

(52) U.S. Cl.
CPC ............ *G07F 13/04* (2013.01); *B05B 7/0416* (2013.01); *B65D 83/42* (2013.01); *B67D 3/0093* (2013.01); *G07F 7/0609* (2013.01)

(56) References Cited

U.S. PATENT DOCUMENTS 8,844,584 B1 * 9/2014 Haley ........................ B65B 3/26 141/3
9,324,079 B2 * 4/2016 Moulin .................. G06Q 30/00
9,499,387 B2 * 11/2016 Nicol ..................... G05B 15/02
9,569,748 B2 * 2/2017 Peters, Jr. ............... G07F 9/002
10,517,206 B2 * 12/2019 Wintemute ........ G06K 7/10366
11,825,763 B2 * 11/2023 Wintemute ........ G06K 7/10386
2010/0146587 A1 * 6/2010 Sholes ................... B67D 7/348 726/2
2013/0240084 A1 * 9/2013 Carter ................... G07F 13/025 141/94
2014/0053944 A1 * 2/2014 Wang .................... H04L 67/535 141/94
2014/0263425 A1 * 9/2014 Akdogan ........... B65D 83/0409 222/23
2015/0375984 A1 * 12/2015 Arcand ................. G07F 13/065 141/94
2017/0022045 A1 * 1/2017 Ray ....................... G07F 13/025
2017/0314733 A1 * 11/2017 Tilhof ..................... F17C 13/02
2021/0087043 A1 * 3/2021 Szeteli ................. B67D 3/0006

FOREIGN PATENT DOCUMENTS

JP 2017534035 A 11/2017
WO WO 2015/077758 A1 5/2015

OTHER PUBLICATIONS

International Search Report and Written Opinion corresponding to PCT/EP2022/061905, Sep. 9, 2022, 15 pages.
Japanese Office action for Application No. 2023-565606, dated Nov. 5, 2023, dated Nov. 5, 2024, 24 pages.

* cited by examiner

134

REFILLING STATION FOR DISPENSER CAN WITH TRANSPONDER READER AND DISPENSER CAN TRANSPONDER

CROSS-REFERENCE TO RELATED APPLICATION

This application is a national stage application, filed under 35 U.S.C. § 371, of International Patent Application No. PCT/EP2022/061905, filed on May 4, 2022, claiming priority of the German patent application DE 10 2021 114 319.5, filed on Jun. 2, 2021, both being incorporated by reference herein in its entirety.

FIELD OF INVENTION

The invention relates to a refilling station, a refilling arrangement and a method of operating a refilling station.

ART BACKGROUND

Dispenser cans are known which can be refilled automatically by means of a refilling station. One such known refilling station is the REFILLO® mat station of the applicant Würth. This safe and economical system is based on the automatic refilling of emptied dispenser cans with active ingredient and compressed air. This makes it possible to fill dispenser cans with active ingredients from bulk containers (such as canisters or drums). To do this, the dispenser cans for the individual active ingredients are pressed onto the corresponding refilling station. The dispenser can is then filled with active ingredient and compressed air in a predefined ratio. To prevent confusion between the dispenser can and the associated active ingredient, the can receiving device is mechanically coded so that only the correct dispenser can can be mechanically fastened to the correct can receiving device. This means that only a mechanically matching dispenser can can be used with the associated refilling station. A possibly dangerous mix-up of active ingredients and dispenser cans is thus mechanically suppressed.

SUMMARY OF THE INVENTION

There is a need to provide a refilling station with increased reliability against misuse.

This need is met by the subject matters having the features according to the independent claims. Further embodiments are shown in the dependent claims.

According to an embodiment of the present invention, a refilling station is provided comprising a receiving device for receiving a dispenser can to be refilled with an active ingredient, a transponder reader for reading dispenser can-related data of a dispenser can transponder attached to the dispenser can when the dispenser can is attached to the receiving device, and a control device for controlling the refilling of the dispenser can with the active ingredient based on the read dispenser can-related data.

According to another embodiment of the present invention, a refilling arrangement is provided comprising a refilling station having the features described above and a dispenser can attachable or attached to the receiving device having a dispenser can transponder in which dispenser can-related data is stored, which is readable by means of the transponder reader when the dispenser can is attached to the receiving device.

According to yet another embodiment of the present invention, a method of operating a refilling station is provided, the method comprising receiving a dispenser can to be refilled with an active ingredient at a receiving device of the refilling station, reading dispenser can-related data of a dispenser can transponder attached to the dispenser can by means of a transponder reader of the refilling station when the dispenser can is attached to the receiving device, and controlling the refilling of the dispenser can with the active ingredient based on the read dispenser can-related data by means of a control device of the refilling station.

In the context of the present application, a "refilling station" can be understood in particular as an apparatus which is configured for refilling an at least partially emptied dispenser can, which can be mechanically and fluidically coupled to the refilling station, with an active ingredient from an active ingredient container to be connected. A refilling station can therefore provide a fluidic connection between a container for providing active ingredient to be refilled and the dispenser can to be refilled, and optionally be configured to provide compressed gas to be refilled to the dispenser can.

In the context of the present application, a "receiving device" can be understood to mean, in particular, a mechanical and fluidic adapter which is configured to receive, in particular in a form-fitting manner, a dispenser can to be refilled and, in the received state, can provide active ingredient and/or compressed gas to the dispenser can. In addition to the mechanical adapter function, the holding device can also function as a fluid adapter for providing a fluid connection between a container with active ingredient and the dispenser can to be refilled with the active ingredient.

In the context of the present application, a "dispenser can" (for example configured as a spray can) can in particular be understood as a can which can be handled by a user and which is configured for dispensing (in particular for spraying a spray mist or for dispensing active ingredient in the form of an active ingredient jet, a foam or a gel) preferably liquid active ingredient. This active ingredient is under pressure inside the dispenser can, whereby compressed or propellant gases in the dispenser can (for example propane, butane, compressed air, carbon dioxide, helium or nitrogen) can be used to discharge the active ingredient from the dispenser can. Through a nozzle, the ingredients (in particular, active ingredient or an active ingredient-propellant mixture) may or may not be sprayed out of the spray can, atomized, and/or discharged in other forms. Medium present in the spray can can be sprayed out of the spray can, in particular, as an aerosol.

In the context of the present application, an "active ingredient" may be understood to mean, in particular, a medium that provides the actual function of the dispenser can when sprayed from the dispenser can. Such an active ingredient may comprise a liquid, a gel, a viscous medium and/or a gas, optionally comprising solid particles. For example, such an active ingredient may be a cleaner (for example, a brake cleaner), a rust remover, a maintenance oil, a silicone spray, a windshield cleaner, a leak detection medium, a welding spray, etc. In a refilling station, such an active ingredient can be refilled from a container (for example, a canister) into a dispenser can to be refilled.

In the context of the present application, a "control device" can be understood in particular as a device which controls the process of refilling active ingredient into a dispenser can, in particular permits it in a defined manner or prevents it in the event of an error. In particular, such a control device may comprise at least one processor and/or part of a processor that evaluates provided information about an intended and/or performed refilling process and, if necessary, performs, adjusts, restricts, extends or disallows the refilling process. In particular, the control device can control or regulate individual components of the refilling station for this purpose.

In the context of the present application, a "transponder" may be understood to mean, in particular, a device for wireless communication, monitoring and/or control that receives signals wirelessly and can respond automatically thereto. A transponder may be active or passive. Active transponders supply themselves with energy. For example, an active transponder may have a battery built into it, or an active transponder may be connected to an external power supply. Passive transponders do not have their own energy source and draw energy used for communication from the electromagnetic field of a transponder reader. Examples of transponders include RFID (Radio Frequency Identification Tag) transponders, NFC (Near Field Communication) transponders, WLAN (Wireless Local Area Network) transponders, Bluetooth transponders, ZigBee transponders, etc. Optical scanners for 1D or 2D codes can also be provided.

In the context of the present application, a "dispenser can transponder" may be understood to mean, in particular, a transponder that is physically connected to a dispenser can and logically associated with the dispenser can. Therefore, a dispenser can transponder is structurally and functionally associated with an associated dispenser can. Consequently, dispenser can-related data of the dispenser can transponder has a reference to an associated dispenser can.

In the context of the present application, a "transponder reader" can be understood to mean in particular a device which is configured for wireless reading of the identification of a transponder. An associated communicable coupling between transponder and reader can take place by means of electromagnetic radiation generated by the transponder reader (for example in the form of short-range alternating magnetic fields or by high-frequency radio waves). This not only allows data to be transmitted, but can also supply the transponder with power. The transponder reader contains software that controls the reading process and, if necessary, further software for providing an interface to one or more further systems coupled for communication.

According to an exemplary embodiment of the invention, in a refilling station for refilling active ingredient into a refillable dispenser can, a dispenser can transponder is attached to the dispenser can at such a position that the dispenser can transponder can be read by a transponder reader of the refilling station (in particular only or selectively) when the dispenser can is attached to a receiving device of the refilling station for refilling the active ingredient. When the dispenser can is attached to the receiving device, a fluid connection to active ingredient in an active ingredient container can be formed by means of the receiving device for refilling the active ingredient into the dispenser can, and the active ingredient can be supplied into the dispenser can. Advantageously, the transponder reader may be provided with a limited reading range so that a readability distance of the transponder reader for reading the dispenser can transponder is reached only when the dispenser can is attached to the receiving device. Advantageously, the dispenser can transponder can, for example, be attached to the bottom of the dispenser can or so close to the bottom that reading of the dispenser can transponder by the transponder reader of the refilling station is only possible when a refilling valve of the dispenser can is mounted on a corresponding fluid interface of the receiving device—i.e. when the dispenser can is brought into position for refilling at the refilling station. This reliably prevents the misreading of transponders that do not belong to a dispenser can to be refilled. The dispenser can transponder can advantageously be placed, for example, in the vicinity of the refill valve or can be arranged on the spray head or spray neck. With the reading of a dispenser can transponder on a dispenser can to be refilled, dispenser can-related data can be read out by means of the transponder reader, which can be used to correctly control the refilling by a control device for controlling the refilling station. In particular, it can be ensured on the basis of the dispenser can-related data that only an active ingredient that is suitable and approved for this dispenser can can be filled into the dispenser can characterized in this way. Incorrect filling of a dispenser can with an active ingredient that is unsuitable for this purpose, which may be dangerous in terms of operational safety, can be reliably ruled out in order to avoid damage to the health of a user (for example, due to an explosion of a flammable active ingredient such as gasoline in a dispenser can that is unsuitable for this purpose) and to avoid damage or even destruction of the dispenser can. Even in the case of mechanical manipulation of a receiving device and/or a dispenser can by a user in order to refill unsuitable dispenser cans at a refilling station, a compatibility of the dispenser can with the system can be checked by means of the dispenser can transponder before the start of a refilling process. It is also possible to use data read out by means of the transponder to detect if an agent is to be filled into the dispenser can that is incompatible with the refilling station (for example, because it would have corrosive properties for that refilling station). Embodiments of the invention thus offer good operational safety, since it is ensured that when refilling a dispenser can, the correct active ingredient in this respect can be used, a durability safety is ensured, etc.

Additional exemplary embodiments of the refilling station, the refilling arrangement, and the method are described below.

According to an exemplary embodiment, the transponder reader may be configured to read active ingredient container-related data of an active ingredient container transponder associated with an active ingredient container for providing active ingredient, wherein the control device may be configured to control the refilling of the dispenser can with the active ingredient from the active ingredient container transponder associated with the active ingredient container based on the read active ingredient container-related data. In a corresponding manner, the active ingredient container can be provided with or associated with an active ingredient container transponder in which active ingredient container-related data is stored. Most advantageously, in addition to the dispenser can transponder described above, an active ingredient container transponder can also be associated with the active ingredient container for providing active ingredient for refilling the dispenser can. The active ingredient container transponder may contain or store data characterizing the active ingredient container and/or an active ingredient contained therein. For example, the active ingredient container-related data can indicate which active ingredient (for example, brake cleaner) is contained in an active ingredient container and/or which properties the active ingredient container has (for example, capacity, residual filling with active ingredient, etc.). When the active ingredient container-related data is supplied to the control device, it can check whether an active ingredient provided from the active ingredient container is compatible with a dispenser can, in particular whether it meets specified safety criteria, by comparing it with the dispenser can data. For example, a matching can transponder and active ingredient container transponder will not result in refilling if the refilling station is not approved for the active ingredient. A refilling station cannot then be recoded for a different active ingredient by the end user.

According to an exemplary embodiment, the transponder reader may be configured to selectively read the active ingredient container-related data when the active ingredient container transponder is attached or held by a user in a predetermined area on a housing of the refilling station. In a corresponding manner, the active ingredient container can be provided with or associated with an active ingredient container transponder in which active ingredient container-related data is stored that can be selectively read by means of the transponder reader when the active ingredient container transponder is attached to or held in a predetermined area on a housing of the refilling station. It is particularly preferred that the active ingredient container transponder only comes within a readable distance of the transponder reader of the refilling station when the active ingredient container transponder is attached to a predefined position (in particular appropriately marked for a user) of a housing of the refilling station, in particular when it is adhered there. Misreading of other transponders in the surrounding area of the refilling station can then be avoided. A user can remove such an active ingredient container transponder from the associated active ingredient container and attach it to a housing surface of the refilling station that is, for example, appropriately marked to enable it to be read by the transponder reader.

According to an exemplary embodiment of the invention, it can be ensured that each active ingredient container transponder can only ever be used or released once. This ensures a high level of operational and process reliability.

It should be noted that the transponder reader may have a common reading unit for reading the dispenser can transponder and the active ingredient container transponder, for example containing a common reading coil. Alternatively, it is also possible for the transponder reader to have a first reading unit for reading a dispenser can transponder arranged on the receiving device, for example containing a first reading coil, and a second reading unit separate therefrom for reading the active ingredient container transponder arranged on the housing of the refilling station, for example containing a second reading coil.

According to an exemplary embodiment, the control device can be configured to permit refilling of the dispenser can with the active ingredient only if the read dispenser can-related data and/or the read active ingredient container-related data indicate compatibility of the dispenser can with the active ingredient. For example, the dispenser can-related data may indicate for which active ingredient the associated dispenser can is suitable. The active ingredient container-related data may indicate for which type of dispenser cans the provided active ingredient is suitable. Matching the dispenser can-related data with the active ingredient container-related data allows error-resistant refill operation.

According to an exemplary embodiment, the control device can be configured to permit refilling of the dispenser can with the active ingredient only if the read dispenser can-related data and/or the read active ingredient container-related data indicate compatibility of the active ingredient with the refilling station. For example, a refilling station may be incompatible with certain (for example, corrosive) active ingredients. If the read data indicates the presence of an active ingredient with properties for which a present refilling station is unsuitable, the control device can prevent refilling of a dispenser can with this active ingredient at the present refilling station in order to protect the refilling station from damage.

According to an exemplary embodiment, the refilling station may comprise a display device for displaying dispenser can-related data and/or active ingredient container-related data. For example, such a display device may be an electronic display device, such as a liquid crystal display. It is also possible for the display device to provide user input to a user, for example when the display device is configured as a touchpad. The display device may be attached to a housing of the refilling station. A display device may guide a user through a filling process, enable configuration by a user, and/or display information read from a transponder of the dispenser can and/or the active ingredient container.

According to an exemplary embodiment, the dispenser can-related data may comprise data for identifying and/or characterizing a dispenser can, data for identifying a user of a dispenser can, data for identifying and/or characterizing an active ingredient for refilling into the dispenser can, and/or data for indicating an amount of active ingredient to be refilled into a dispenser can. Alternatively or additionally, the dispenser can-related data may comprise other information for characterizing the associated dispenser can and/or a user associated with the dispenser can.

According to an exemplary embodiment, the active ingredient container-related data may comprise data for identifying and/or characterizing an active ingredient container, data for identifying and/or characterizing an active ingredient in the active ingredient container, and/or data for indicating a filling quantity of active ingredient in the active ingredient container. Alternatively or additionally, the active ingredient container-related data may comprise other information for characterizing the associated active ingredient container.

According to an exemplary embodiment, the transponder reader may have a readability distance of at most 10 cm, in particular at most 5 cm. In other words, the transponder reader may be configured to read only transponders that are within said readability distance, i.e., within a maximum distance from the transponder reader of at most 10 cm and preferably at most 5 cm. An incorrect reading process, with which transponders located further away are mistakenly and unintentionally read, can thus be prevented. The said reading distance can be set by selecting a suitable transponder technology (in particular RFID technology, further in particular with low frequencies (for example as 125 kHz-LF transponder)) and/or an excitation energy for the transponder reader.

According to an exemplary embodiment, the transponder reader can have a power limitation and/or an enclosure that protects against electrostatic discharges at the refilling station, i.e. ensures ESD (electrostatic discharge) protection, even in the presence of a flammable active ingredient. For example, as a result of friction of active ingredient when flowing through hoses during refilling of dispenser cans, electrical charges can occur, which can lead to challenges with regard to operational safety, especially when using flammable active ingredients (for example, containing gasoline). In order to rule out sparking or even a tendency to explode, the transponder reader can therefore be operated in the low-energy range. Specific grounding at the refilling station can also further improve ESD protection. At the same time, this has the advantage that the readability distance of the transponder reader is also kept low, which in turn reduces the risk of incorrect readings.

According to an exemplary embodiment, the receiving device may be coupled or couplable to an active ingredient supply device for supplying active ingredient from an active ingredient container into a dispenser can received on the receiving device and/or to a compressed gas supply device for supplying compressed gas from a gas reservoir into a dispenser can received on the receiving device. For example, the supply means may comprise hoses. Such hoses or the like may be fluidically coupled to the receiving device via one or more suitable fluid valves to control the timing of the supply of active ingredient and compressed gas.

According to an exemplary embodiment, the control device can be configured to determine a quantity of active ingredient refilled into the dispenser can. Such information can be derived by the control device from operating data and/or sensor-detected data of the refilling station.

According to an exemplary embodiment, the control device can be configured to determine a number of refilling processes of the dispenser can. For example, a counter can be incremented for each refilling process of a dispenser can for this purpose. In this way, the consumption of active ingredient assigned to a user of a dispenser can can also be documented and stored, for example in a database of the refilling station assigned to the control device and/or in the dispenser can transponder. A dispenser can can thus be personalized, i.e. assigned to a user (for example installer). Furthermore, it is thus possible to limit a maximum number of refilling operations of a dispenser can, for example to ensure operational safety with regard to wear of a dispenser can.

According to an exemplary embodiment, the control device can be configured to determine a residual amount of active ingredient in the dispenser can before a refilling process and to control a subsequent refilling process to avoid overfilling the dispenser can. This can be done, for example, by means of a scale which can be arranged in the area of the receiving device and can determine any residual filling of a dispenser can (characterized in particular by means of dispenser can-related data read out from the dispenser can transponder) with active ingredient before refilling. In this way, overfilling and damage to the dispenser can can be avoided and a refilling process can be reliably controlled.

According to an exemplary embodiment, the control device can be configured to trigger a reorder of an active ingredient container with active ingredient if the control device and/or a scale detects a drop in a residual filling of a currently used active ingredient container below a predetermined threshold value. For example, on the basis of read-out active ingredient container-related data of an active ingredient container transponder assigned to an active ingredient container in combination with a count of refilling processes and refilling quantities using an active ingredient container as active ingredient source, the control device can determine which residual quantity of active ingredient is contained in an active ingredient container. If the residual amount of active ingredient in an active ingredient container falls below a predefinable threshold value (in particular below a certain residual volume, below a certain residual weight or below a certain residual filling percentage), the refilling station can trigger a reorder of an active ingredient container with new active ingredient, for example via a communication network. This can ensure that a new active ingredient container arrives in good time before the previously used active ingredient container is emptied and can be attached to the refilling station.

According to an exemplary embodiment, the refilling station can have a scale for detecting weight information indicative of a weight of the dispenser can on the receiving device before a refilling process and/or during a refilling process, wherein the control device can be configured to control refilling of the dispenser can with the active ingredient based on the detected weight information. For example, such a scale can be configured as a beam scale and determine which residual filling a dispenser can has before refilling. Based on this information, the refilling process can be precisely controlled and overfilling can be avoided.

According to an exemplary embodiment, the transponder reader can be configured as an RFID reader, in particular as an RFID reader with an operating frequency of 125 kHz, or as an NFC reader. In a corresponding manner, the dispenser can transponder and/or the active ingredient container transponder can may be configured as an RFID transponder, in particular as an RFID transponder with an operating frequency of 125 kHz, or as an NFC transponder. RFID technology in combination with the aforementioned low operating frequency allows the adjustment of a sufficiently low readability distance and thus a precise avoidance of incorrect readings of RFID tags further away. Alternatively, the transponder technology used can also be near-field communication.

According to an exemplary embodiment, the refilling arrangement can have an active ingredient container that contains active ingredient and is coupled or can be coupled to the receiving device in order to provide active ingredient for refilling the dispenser can. Such an active ingredient container can be, for example, a canister or a drum, for example, with a receiving volume of active ingredient in the range of 5 l to 100l, in particular in the range of 5 l to 80 l.

According to an exemplary embodiment, the active ingredient container transponder can be configured as a label, in particular an adhesive label, that can be detached from the active ingredient container in a defined manner. Such a label preferably has printing. In other words, the active ingredient container transponder associated with an active ingredient container can be attached to an adhesive label that a user can tear off from the active ingredient container and bring within a readability distance of the transponder reader of the refilling station, in particular by holding or attaching the active ingredient container transponder to a housing of the refilling station. Preferably, a user can bring the active ingredient container transponder into the readability distance of the transponder reader by sticking the adhesive label with active ingredient container transponder to a correspondingly marked area on an outside of the housing of the refilling station. With this very intuitive user activity, the reading process is triggered in a targeted and error robust manner. To simplify the logistics of the active ingredient container from the manufacturer to the user or consumer, the use of a multi-label (i.e., an RFID transponder printed with 1D, 2D, and/or 3D code) is advantageous. This allows not only the release process at the refilling station to be realized, but also the internal and external goods process.

According to an exemplary embodiment, the refilling arrangement may include a gas reservoir configured to provide compressed gas and coupled or couplable to the receiving device to provide compressed gas for refilling the dispenser can. Such a gas reservoir may be, for example, a compressed gas container or a connection to a compressed gas line. If the dispensing can is configured as a BoV (bag-on-valve) dispensing can in which compressed gas is permanently contained and does not escape from the dispensing can when active ingredient is dispensed, a compressed gas reservoir for refilling compressed gas into a dispensing can may be dispensable.

According to an exemplary embodiment, the refilling arrangement may comprise a portable user terminal device with an app that is communicably coupled to the control device for controlling the refilling arrangement. For example, a user can control the refilling arrangement from their mobile device and also provide control commands to the control device.

Exemplary embodiments of the present invention are described in detail below with reference to the following figures.

DETAILED DESCRIPTION

Figure 1:
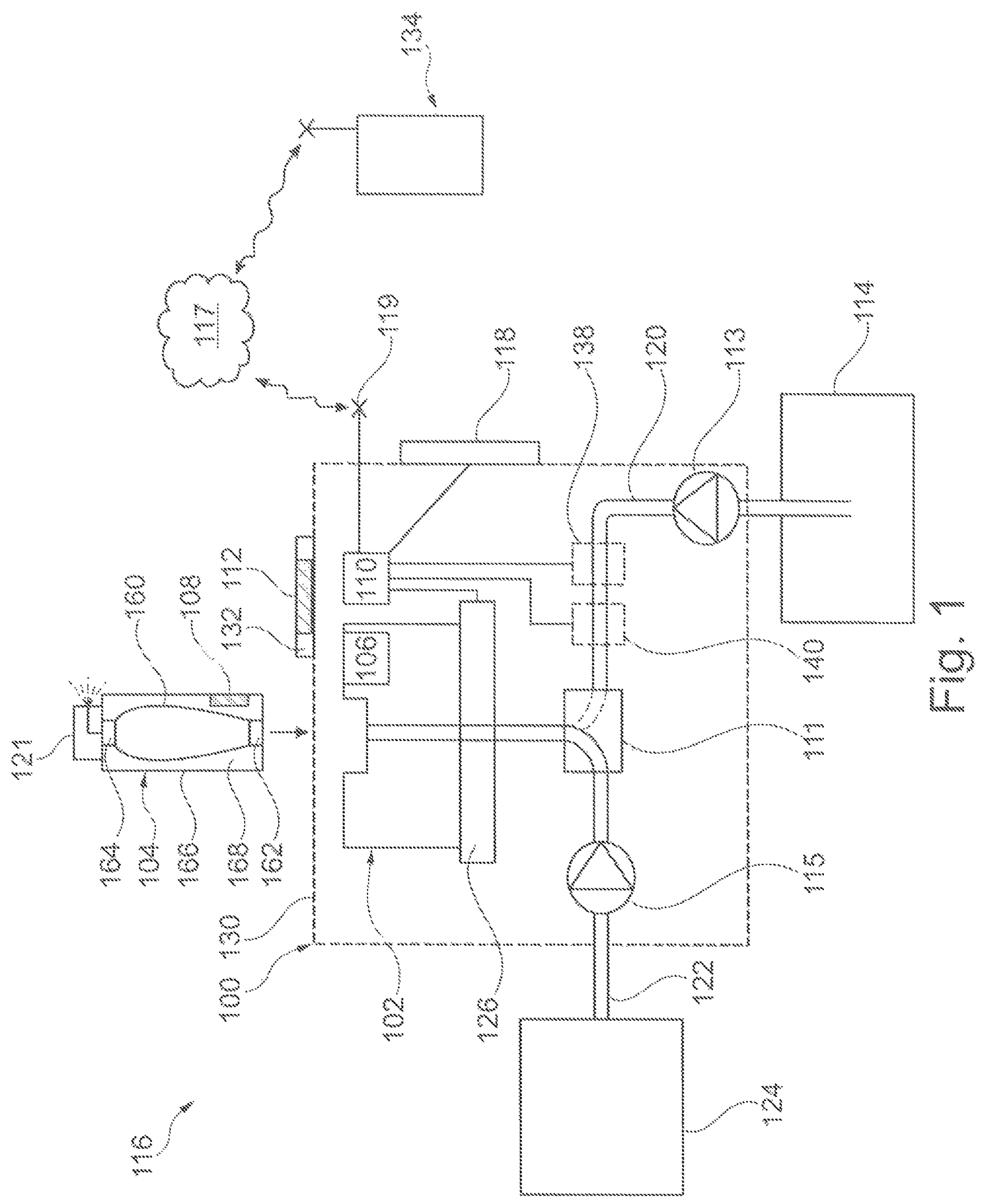
FIG. 1 shows a refilling arrangement with a refilling station, an active ingredient container and a dispenser can according to an exemplary embodiment of the invention.

Identical or similar components in different figures are given the same reference numerals.

Before describing exemplary embodiments of the invention with reference to the figures, a few more general aspects of embodiments of the invention will be explained.

According to embodiments of the invention, a refilling station is provided that uses active ingredient from a container (for example, a 20 l canister or a 60 l drum) to fill or refill a dispenser can. Here, the dispenser can may be, for example, an aerosol can with a filling valve on its underside. Furthermore, a mechanical coding may be formed on the underside of the dispenser can, which corresponds to a corresponding shaping of a receiving device of the refilling station. In addition, the dispenser can may have a spray valve on its upper side for dispensing an active ingredient or medium from the dispenser can.

The filling station can have a fluid connection to a container from which active ingredient is filled into the dispenser can to be refilled. For example, such a fluid connection can be formed by means of a hose in order to supply active ingredient or medium from the container of the refilling station to a dispenser can. Preferably, such hoses are ESD-discharge capable (ESD=electrostatic discharge). In particular, the refilling station can have a holding device or placement device for the dispenser can with a mechanical coding, so that only mechanically suitably coded dispenser cans can be placed on a corresponding refilling station. Furthermore, a locking device may be provided on the receiving device to hold the dispenser can on the receiving device during its filling. Preferably, the dispenser can may be configured to rotate about the longitudinal axis regardless of its angular position relative to the receiving device, i.e., illustratively freely positionable on the coding plate through 360°, without affecting the proper connection between the dispenser can and the receiving device. Optionally, the refilling station can be equipped with a compressed air connection (where compressed air is available, for example, in any automotive workshop) for filling compressed air into the dispenser can together with the active ingredient. The filling process can be controlled by means of a control device. For example, when filling a dispenser can, active ingredient can be supplied first, followed by a pressurized medium (for example, compressed air). Both can be controlled pneumatically by means of a three-way valve, for example. For this purpose, the refilling station can be equipped with a piston with cylinder (for example, a stainless steel or plastic cylinder) to receive active ingredient and fill a defined quantity of the active ingredient into the dispenser can.

Advantageously, the refilling station can be connected to an electrical equipotential bonding, since friction of the active ingredient during refilling can lead to electrostatic charging. For example, a refilling station can be mounted in a shelf, whereby at least one container (for example a canister, for example with a capacity of 20 l) can be arranged in the shelf. It is also possible to design the refilling station with an attachment on an active ingredient drum (for example with a capacity of 60 l) or in a hazardous substances cabinet as a ballast adapter. Suitable potential equalization can be achieved by grounding.

According to an exemplary embodiment of the invention, an RFID transponder or another suitable dispenser can transponder can, for example, be glued to the bottom of a dispenser can or be attached to the dispenser can in a protected manner under a plastic layer. If an associated dispenser can is to be refilled with an active ingredient and the dispenser can is attached for this reason to a receiving device of a filling station, the dispenser can transponder comes within the readability distance of a transponder reader of the refilling station, which can therefore read dispenser can-related data from the dispenser can transponder. A control device can correctly and precisely control a refilling process of the dispenser can on the basis of this dispenser can-related data and, in particular, ensure that only active ingredient that is suitable and approved for the dispenser can characterized by means of the dispenser can-related data is filled into the dispenser can. Advantageously, an active ingredient container that can provide active ingredient for refilling a dispenser can also be equipped with an active ingredient container transponder that can be read by means of the transponder reader. This enables a comparison to be made between the dispenser can characterized by means of the dispenser can-related data on the one hand and the active ingredient of the active ingredient container characterized by means of the active ingredient container-related data on the other hand. This ensures that a filling process is only released if the active ingredient and dispenser can or active ingredient and refilling station match to each other.

By means of RFID technology on the dispenser can and the refilling station, media security can thus be ensured, i.e. compatibility between the dispenser can to be refilled and the active ingredient to be refilled therein. In particular, a refilling station can advantageously be equipped with a short-range RFID reader (of no more than 5 cm, for example). An associated dispenser can (in particular an aerosol can) can be equipped with an RFID transponder. The RFID technology used can operate in a low frequency range of 125 kHz. A spatial range can then correspond to a range of no more than 5 cm, for example. An active ingredient container can operate in an associated manner with a further RFID transponder in a low frequency range of 125 kHz. A spatial range of the further RFID transponder may also correspond, for example, to a range of no more than 5 cm. This enables the refilling station to identify which active ingredient container is connected to the refilling station. Advantageously, the RFID transponder of the active ingredient container can be configured as a tear-off transponder (which can also be referred to as a stick & go label). Such a tear-off transponder may have a tear-off ticket on the active ingredient container that has an RFID transponder. The section of the label that is tear-off has the RFID transponder including the chip. The tear-off section with RFID transponder can be held or stuck to the refilling station in order to identify or characterize an associated active ingredient container (in particular with regard to the quantity and/or type of active ingredient).

According to an exemplary embodiment of the invention, the refilling station can record which quantity of the active ingredient or medium has been filled into the dispenser can or aerosol can. Furthermore, it may be possible to record how many filling operations have been performed with a dispenser can or with an active ingredient container. It is also possible to record the residual quantity of active ingredient or medium in the dispenser can before a filling process. Re-orders of an active ingredient container can be triggered in good time before it is emptied. In addition, protection against misuse is possible on the basis of a comparison between the dispenser can and the active ingredient of an active ingredient container, based on read-out data stored in the dispenser can transponder or the active ingredient container transponder. Furthermore, it is possible to detect a residual amount of active ingredient in a connected active ingredient container. In particular, it is possible to calculate withdrawn quantities to determine a residual quantity of active ingredient in an active ingredient container. According to an embodiment example, a spray or aerosol can can be assigned to a user. For a particular spray or aerosol can, the number of filling operations and/or quantities of active ingredient filled (for example, current and accumulated over all filling operations) can also be recorded and/or calculated.

Advantageously, a refilling station according to an exemplary embodiment of the invention can be used in a gas station or in a logistics station where a user can refill a dispenser can.

An active ingredient container can have an RFID transponder detachably attached to the active ingredient container, which can be detached from the active ingredient container and attached to a refilling station in order to identify the active ingredient container at the refilling station. The refilling station can therefore determine which active ingredient is attached and how much active ingredient is in the active ingredient container. If an active ingredient is unsuitable for the refilling station (for example, because the active ingredient is corrosive in the refilling station), the refilling station will not fill the active ingredient. If a dispenser can (in particular an aerosol can) is unsuitable for a medium or an active ingredient, the refilling station does not fill the medium or the active ingredient into the dispenser can, which is configured as an aerosol can, for example.

FIG. 1 shows a refilling arrangement 116 comprising a refilling station 100, an active ingredient container 114 and a dispenser can 104 according to an exemplary embodiment of the invention. The refilling arrangement 116 is used to fill or refill a completely empty or partially empty dispenser can 104 with an active ingredient (for example, brake cleaner) so that the dispenser can 104 can be easily filled with an associated active ingredient by a user. The active ingredient can then be sprayed or more generally dispensed from the dispenser can 104 at a point of use. After emptying or re-emptying the dispenser can 104, the dispenser can 104 can then be refilled with new active ingredient at the refilling arrangement 116, and so on.

For this purpose, the refilling station 100 has a receiving device 102, which functions as a dispenser can adapter, for receiving a dispenser can 104 to be refilled with an active ingredient in a form-fitting and fluid-coupling manner. The receiving device 102 may be in the form of a coding plate having a mechanical interface that is form-fitted to a corresponding mechanical interface of the dispenser can 104 to be refilled. In this way, only mechanically matching dispenser cans 104 can be attached to the receiving device 102, making misuse unlikely. Although not shown in FIG. 1, a locking device may be attached to the receiving device 102 to lock a dispensing can 104 attached to the receiving device 102 to the receiving device 102 during filling. In this way, it can be ruled out that pressure exerted on the dispenser can 104 during refilling or forces acting on the dispenser can 104 lead to an undesired detachment of the dispenser can 104 from the receiving device 102. After refilling is complete, the locking device may either automatically release the dispenser can 104 or may be moved to a state releasing the dispenser can 104 by user actuation. A user may then remove the refilled dispenser can 104 from the receiving device 102 and transport it to a deployment location.

Further, the refilling arrangement 116 may include the active ingredient container 114, which may be, for example, a canister or drum filled with an active ingredient (for example, brake cleaner) to be refilled. Thus, the active ingredient container 114 contains the active ingredient to be filled into the dispenser can 104 and may be fluidly coupled or couplable to the receiving device 102 to provide active ingredient for refilling the dispenser can 104.

If the dispenser can 104 is not a BoV (bag-on-valve) dispenser can with a pressurized medium permanently contained therein, unlike in FIG. 1, see description below, the refilling arrangement 116 may further comprise a gas reservoir 124 configured to provide compressed gas and fluidically coupled or couplable to the receiving device 102. In this manner, the gas reservoir 124 can be used to provide compressed gas (for example, compressed air) for filling the dispenser can 104. For example, the gas reservoir 124 may be a connection to a compressed gas line or a compressed gas cylinder containing compressed gas.

As illustrated in FIG. 1, at least one valve 111, which in the illustrated embodiment is a three-way valve, may form a fluid connection between the active ingredient container 114, the optional compressed gas reservoir 124, and the receiving device 102. As shown, the receiving device 102 may be fluidly coupled to an active ingredient supply device 120 for supplying active ingredient from the active ingredient container 114 to a dispensing can 104 received on the receiving device 102. Further, the receiving device 102 may be fluidly coupled to an optional compressed gas supply device 122 for supplying compressed gas from the gas reservoir 124 into the dispenser can 104 received on the receiving device 102. For example, the at least one valve 111 can be controlled by means of a control device 110 such that initially only active ingredient is filled into the at least partially emptied dispenser can 104 before the at least one valve 111 is switched such that subsequently only compressed gas from the gas reservoir 124 is filled into the dispenser can 104. This can ensure that a predefined amount of active ingredient is filled into the dispenser can 104. A delivery device 113, for example a pump, may be arranged between the active ingredient container 114 and the receiving device 102 to deliver active ingredient from the active ingredient container 114 to the receiving device 102 and from there into the dispenser can 104. Optionally, a delivery device 115, for example a compressor or pump, may also be arranged between the gas reservoir 124 and the receiving device 102.

FIG. 1 shows with an arrow how the dispenser can 104 is placed on the receiving device 102. In a bottom area of the dispenser can 104 in the area of its refill valve 162, the dispenser can 104 is equipped with a dispenser can transponder 108, for example an RFID tag. At said bottom region, the dispenser can 104 is received at the receiving device 102. Such a contactless communicable dispenser can transponder 108 may be, for example, affixed as a label to the dispenser can 104 or attached to and/or embedded in a can housing 166. A solid-state memory of the dispenser can transponder 108 stores dispenser can-related data that may, for example, identify or characterize the dispenser can 104 and an active ingredient to be filled therein and/or may include information about a holding volume of the dispenser can 104, information about desired compressed gas properties in the dispenser can 104, information about a user of the dispenser can 104, etc.

A transponder reader 106 is disposed in the receiving device 102 for contactlessly reading the dispenser can-related data of the dispenser can transponder 108 attached to the dispenser can 104. The transponder reader 106 is arranged in an area of the receiving device 102 such that the dispenser can 104 is in a reading area of the transponder reader 106 only when the dispenser can 104 is attached to the receiving device 102. This advantageously ensures that incorrect reading operations of dispenser cans 104 by the transponder reader 106, which are located in a further surrounding area of the transponder reader 106, are reliably prevented. For this purpose, the transponder technology on the basis of which the transponder reader 106 and the dispenser can transponder 108 communicate may be configured as a short-range transponder technology with a range of, for example, less than 10 cm, in particular less than 5 cm (for example, as a short-range RFID technology). Thus, the dispenser can-related data from the dispenser can transponder 108 can be selectively read by the transponder reader 106 only when the dispenser can 104 is attached to the receiving device 102. The read-out data may be supplied by the transponder reader 106 to a control device 110, or may be stored in a mass electronic memory of the refilling station 100, which is not shown.

Preferably, the active ingredient container 114 is also provided (not shown) or associated with an active ingredient container transponder 112. A solid state memory of the active ingredient container transponder 112 stores active ingredient container-related data that is selectively readable by the transponder reader 106 when the active ingredient container transponder 112 is attached to a housing 130 of the refilling station 100, as shown. To enable or facilitate readability of the active ingredient container transponder 112 by the transponder reader 106, the active ingredient container transponder 112 may be formed as a label 132 that can be detached from the active ingredient container 114 in a defined manner. For example, the label 132 may be formed as an adhesive label equipped with the active ingredient container transponder 112 that a user may detach from the active ingredient container 114, for example formed as a canister, and adhere to the housing 130 at a position provided for this purpose (and, for example, marked accordingly). By this attaching or adhering or alternatively holding in front, the active ingredient container transponder 112 can be brought within the readability distance of the transponder reader 106 so that the active ingredient container-related data can be read by the transponder reader 106. By also requiring the active ingredient container transponder 112 to be brought into the readability distance of the transponder reader 106 by a defined user activity before the active ingredient container-related data can be read by the transponder reader 106, reliable protection is provided against the reading of incorrect active ingredient container-related data. For example, the active ingredient container-related data may include information about the active ingredient in the active ingredient container 114, about a fill quantity or residual fill quantity in the active ingredient container 114, information about a dispenser can 104 or refilling station 100 suitable for this active ingredient, etc.

The control device 110 can evaluate the dispenser can-related data and active ingredient container-related data provided to it by the transponder reader 106 and, for example, check them for compatibility. In particular, the control device 110 can determine from the data read out by means of the transponder reader 106 whether the active ingredient provided by the active ingredient container 114 fits into the dispenser can 104 received at the receiving device 102. In this way, operational safety can be increased, since it can be ruled out that an unsuitable dispenser can 104 is used for, for example, a hazardous active ingredient (for example, one comprising gasoline and therefore at risk of fire). In a corresponding manner, it can be ruled out that an active ingredient originating from an unapproved source is approved for refilling a dispenser can 104. Even if a user manipulates the shape of a dispenser can 104 to mount it on a receiving device 102 notwithstanding the incompatibility of an active ingredient container 114 fluidly coupled to the receiving device 102, this can be detected by the control device 110 by reading the dispenser can transponder 108. Filling of a dispenser can 104 that is unsuitable for a particular active ingredient can therefore be reliably avoided by the transponder configuration described. As a result, a high level of operational reliability can be achieved when using the refilling arrangement 116. If the dispenser can-related data and the active ingredient container-related data show a match, the refilling process is triggered or permitted by the control device 110, otherwise the refilling process is prevented or not permitted.

FIG. 1 further shows that a portable user terminal 134 is communicably coupled to a software app for user control of the refilling arrangement 116 by means of the control device 110. The user terminal 134 may be, for example, a mobile device that may be wirelessly communicably coupled to a communication interface 119 of the refilling station 110 via a communication network 117 (for example, a mobile network or the public Internet). Thus, a user can transmit control commands to the refilling arrangement 116 or monitor in operation of the refilling arrangement 116 even from a remote location.

Further shown in FIG. 1 is that the refilling station 100 includes a display device 118 for displaying information, such as dispenser can-related data, active ingredient container-related data, and/or other information to a user. For example, the display device 118 may be an LCD display or a touch screen. A user may be shown associated information on the display device 118 before, during, and/or after a refill operation by means of the display device 118.

Advantageously, the refilling station 100 according to FIG. 1 can have a scale 126, for example configured as a beam scale, for recording a weight or weight information indicative thereof of the dispenser can 104 at the receiving device 102 before a refilling process and/or during a refilling process. A weight detection of the dispenser can 104 prior to a refilling process allows to qualitatively or quantitatively determine a possible residual filling of the dispenser can 104 with active ingredient and/or with compressed gas, and to adapt or perform a refilling process to be performed subsequently accordingly. By taking into account any residual filling of the dispenser can 104 prior to refilling thereof, overfilling of the dispenser can 104 can be avoided. It is also possible to monitor the weight gain of a dispenser can 104 to be refilled during a refilling operation to avoid any overfilling and underfilling. Consequently, the control device 110, which may be provided with the results of the weight detection by means of the scale 126, may be configured to control a refilling of the dispenser can 104 with the active ingredient based on the detected weight.

Preferably, the scale 126 may be configured to detect cumulative weight information indicative of a cumulative weight of the dispenser can 104, a residual fill of active ingredient in the dispenser can 104, and a portion of the refilling station 100 (in particular, at least a portion of the receiving device 102) prior to a refilling operation and/or during a refilling operation. By means of the control device 110, a refilling of the dispenser can 104 with the active ingredient can then be controlled based on the detected sum weight information. Advantageously, it may thus be dispensable to specifically detect only the weight of the dispenser can 104. It is also possible, and metrologically much simpler, to simply detect said cumulative weight because it is then unnecessary to separate the dispenser can 104 and the receiving device 102 during the weight determination process. By detecting an empty weight of the receiving device 102 without the dispenser can 104 prior to attaching a dispenser can 104 to the receiving device 102, the residual weight of the cumulative weight that differs from the dispenser can weight can be mathematically subtracted when determining the cumulative weight by means of the scale 126 after attaching the dispenser can 104 to the receiving device 102.

As described above, after a dispenser can 104 to be refilled is attached to the receiving device 102 by means of the control device 110, refilling of the dispenser can 104 with the active ingredient may be permitted only if the data determined by means of the transponders 108, 112 indicate a compatibility of a dispenser can 104 attached to the receiving device 102 for refilling with an active ingredient provided by a connected active ingredient container 114.

Alternatively or additionally, permitting a dispenser can 104 to be refilled with an active ingredient may be conditional on an active ingredient detected at a detecting device 138 meeting at least one predetermined permissibility criterion. The admissibility criterion may be whether the active ingredient supplied in the supply device 120 is an active ingredient that is admissible for the dispenser can 104 and/or whether the detected active ingredient in the supply device 120 fulfills an active ingredient origin that is considered admissible for the dispenser can 104.

As shown in FIG. 1, a measurement can be performed by means of the detecting device 138 at the active ingredient supply device 120 for supplying active ingredient from the active ingredient container 114, which is used to characterize and/or identify active ingredient that flows through the supply device 120, which is configured, for example, as a hose, when refilling a dispenser can 104. In this manner, active ingredient that is intended to be used to refill a dispenser can 104 contrary to one or more predetermined acceptability criteria can be identified.

For example, an active ingredient approved for refilling a dispenser can 104 can be provided at the factory with an optically detectable marker, such as a fluorescent marker or a DNA marker. In this way, active ingredient can be marked which, for example, has been approved for refilling into a specific dispenser can 104 and/or meets required quality criteria. When such an active ingredient is supplied through the supply device 120, it can be detected, preferably optically, during supply by the detecting device 138 whether or not the active ingredient meets a predetermined approval criterion. For example, approval of the filling of a dispenser can 104 with active ingredient can be made dependent on the fact that an expected fluorescence signal can be optically detected by means of the detecting device 138.

The control device 110 may be supplied with data detected by the detecting device 138 that is indicative of the predetermined allowance criterion. The control device 102 may then permit or deny refilling of the dispenser can 104 with the active ingredient based on whether or not the active ingredient detected at the detecting device 138 meets the predetermined admissibility criterion. For example, an active ingredient may be allowed to fill a dispenser can 104 only if a corresponding expected fluorescent marker is included in the active ingredient, indicating, for example, a particular active ingredient and/or indicating that active ingredient belongs to a reliable source (for example, from a particular manufacturer). Thus, verification of a predetermined admissibility criterion ensures high quality of the active ingredient and operational reliability of the active ingredient in combination with the dispenser can 104.

In the illustrated embodiment, the detecting device 138 is configured as an optical detecting device for detecting a predetermined optical signal characteristic of the active ingredient to be refilled. The presence of said signal characteristic indicates here that the active ingredient fulfills the predetermined admissibility criterion. Here, with advantage, the detecting device 138 can detect the active ingredient in the hose or in the supply device 120, preferably while flowing through the supply device 120. Once the detecting device 138 has determined the signal characteristic of the candidate active ingredient for refilling a dispenser can 104, this signal characteristic can be transmitted to the control device 110 for evaluation. The control device 110 may then decide, for example, based on a comparison between the determined actual signal characteristic and an expected target signal characteristic, whether or not the signal characteristic indicates compliance with the predetermined eligibility criteria. Depending on the result of this check, the control device 110 may then take action to allow or not allow refilling of the dispenser can 104 with the active ingredient.

If the detected signal characteristic indicates that the active ingredient does not meet the admissibility criterion, the control device 110 may control a prohibiting device 140 to prohibit refilling of the dispenser can 104 with the active ingredient. For example, the prohibiting device 140 may squeeze a supply device 120 configured as a flexible hose such that no more active ingredient can pass through the supply line 120. Alternatively, the prohibiting device 140 may introduce a curable adhesive into the supply device 120 configured as a fluid conduit that chemically seals the supply line 120 and prevents active ingredient from passing through the supply line 120.

The dispenser can 104 may have a mixture of active ingredient and compressed gas in its interior, wherein when an actuation nozzle 121 is actuated, an active ingredient-compressed gas mixture, for example as an aerosol, is discharged or purged from the dispenser can 104. In this case, both new active ingredient and new compressed gas are required to refill the dispenser can 104.

Alternatively, the dispensing can 104 may be a specially configured bag-on-valve dispensing can, as shown in FIG. 1. The refillable dispensing can 104 shown in FIG. 1 is for dispensing an active ingredient and includes a deformable bag 160 therein for containing active ingredient. The bag 160 may be made of plastic or a metal foil, for example. At its bottom, the bag 160 is fluid-tightly connected to a refill valve 162. The refill valve 162 can be fluid-tightly placed on the receiving device 102 and thereby fluidically coupled to the refilling station 100 to allow the bag 160 to be filled or refilled with the active ingredient from the active ingredient container 114. Further, the bag 160 is connected at its top to an outlet valve 164 for user-defined spraying of active ingredient from the bag 160. The actuation nozzle 121 can be placed on the outlet valve 164 to open the outlet valve 164 by actuating the actuation nozzle 121, thereby discharging active ingredient from the bag 160 in the form of a spray.

Further, the dispensing can 104 of FIG. 1 includes a rigid can housing 166 receiving the bag 160, with the refill valve 162 and the outlet valve 164 exposed from the bottom and top of the can housing 166, respectively. In other words, the outlet valve 164 protrudes from the top of the rigid can housing 166 and the refill valve 162 protrudes from the bottom of the rigid can housing 166. The can housing 166 may be, for example, a rigid metal housing. A compressed gas may be fluid-tightly confined within an intermediate volume 168 between the bag 160 and the can housing 166, and may be protected from escaping the dispensing can 104. Thus, the compressed gas is prevented from escaping through the refill valve 162 and/or through the outlet valve 164. Thus, when active ingredient is sprayed through the outlet valve 164, the active ingredient is not mixed with the compressed gas because the compressed gas remains in the intermediate volume 168 and thus in the dispenser can 104. This also eliminates the need to refill compressed gas in the dispenser can 104 shown in FIG. 1. The filling of compressed gas into the intermediate volume 168 can be done at the factory, for example through one of the valves 162, 164 and/or through another valve in the can housing 166 (not shown).

Figure 2:
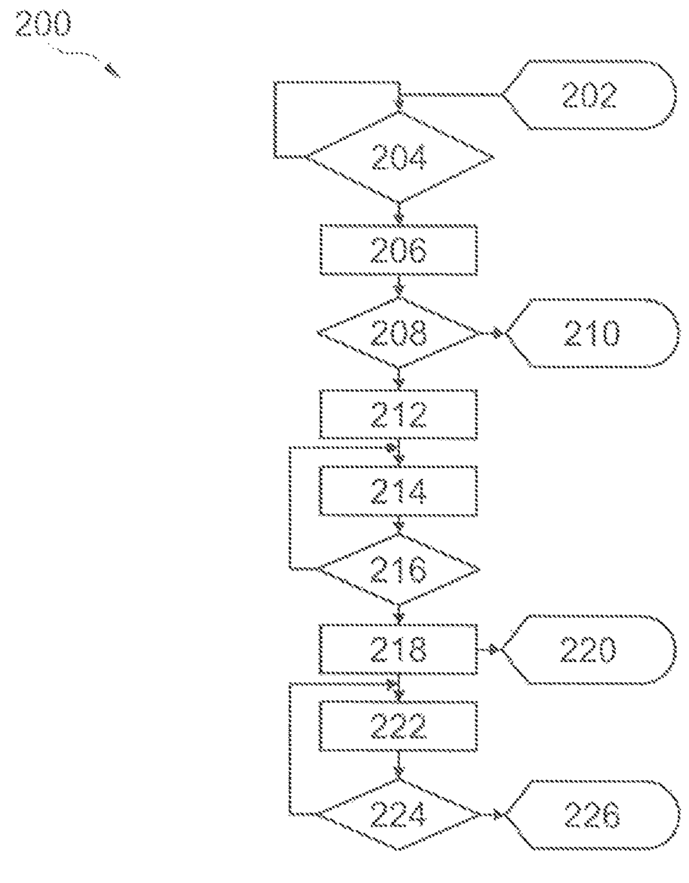
FIG. 2 shows a flowchart illustrating a method of operating a refilling station according to an exemplary embodiment of the invention.

FIG. 2 shows a flowchart 200 illustrating a method of operating a refilling station 100 according to an exemplary embodiment of the invention.

The method of operating a refilling station 100 begins at a block 202, where the refilling station 100 indicates that it is ready to perform the method. This may be indicated at the display device 118.

At a block 204, a weight of a dispenser can 104 to be refilled detected by a scale 126 is verified to be stable within a predetermined range.

If this is the case, the dispenser can transponder 108 is read in a block 206 by means of the transponder reader 106. Furthermore, an active ingredient container transponder 112 can be read out by means of the transponder reader 106.

At a block 208, a determination is made as to whether an agent or medium to be placed in a dispenser can 104 is acceptable. If it is not, the method concludes that the dispenser can 104 is incorrect, see block 210. This may be indicated at the display device 118.

If this is the case, however, the residual amount of active ingredient in the dispenser can 104 to be refilled is determined in a block 212. A pump 113 can then be switched on to deliver active ingredient to refill the dispenser can 104 (block 214).

After refilling dispenser 104 with active ingredient, it can be determined (for example, using scale 126) whether the refilled amount of active ingredient in dispenser 114 is appropriate, see block 216. If it is not, the method repeats the procedure according to block 214 and block 216.

If, on the other hand, this is the case, the method in block 218 determines the filling quantity with active ingredient and adds up the total filling quantity. According to block 220, this can be indicated to a user on the display device 118.

According to the optional block 222, the pump 115 or compressor may then be turned on to introduce compressed gas into the dispenser can 104.

In block 224, it is checked whether the pressure in the refilled dispenser 104 is suitable. If this is not the case, the procedures according to block 222 and block 224 are checked.

If this is the case, however, the operating procedure is terminated, see block 226. Appropriate information may be displayed on the display device 118. An acoustic signal (generated by a buzzer, for example) can indicate the termination of the operating procedure.

In addition to the filling procedure described above, it is possible to use a pressure pulse to detect whether the dispenser can 104 is properly seated on the receiving device 102 prior to filling. Further, after filling, it is possible to transmit data to a communicably coupled node. It is also possible to detect whether an active ingredient container 114 (for example, a drum or canister) is empty. For example, this is possible by monitoring the weight history of such an active ingredient container 114 when filling dispenser cans 104.

Figure 3:
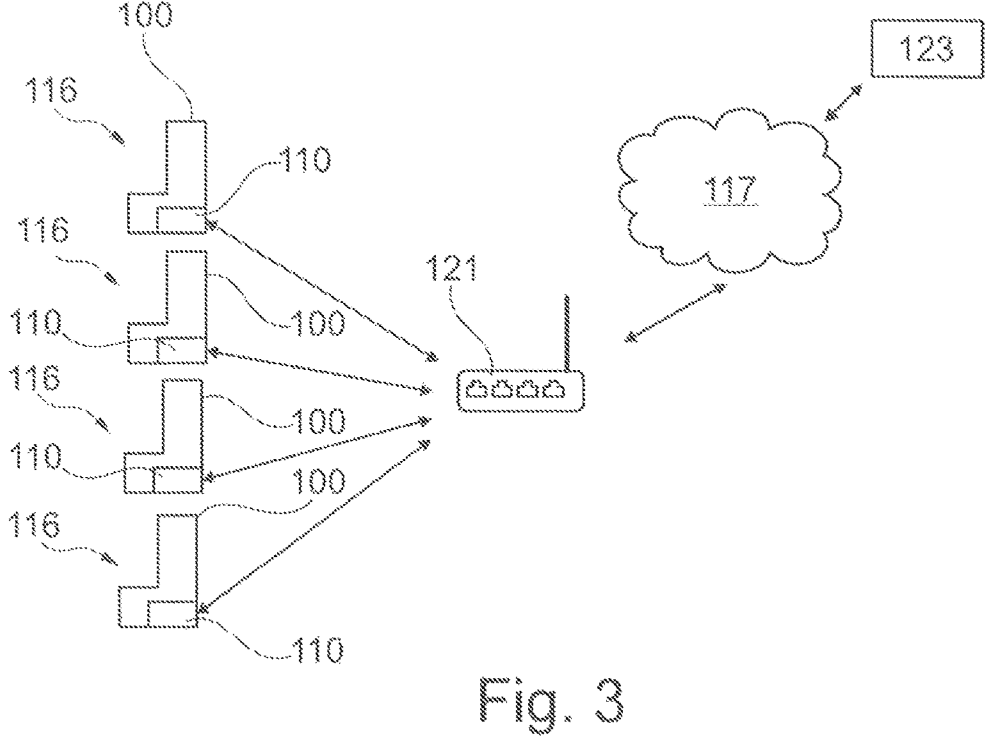
FIG. 3 shows a system with multiple refilling arrangements according to an exemplary embodiment of the invention, which are communicably coupled to a reordering device.

FIG. 3 shows a system comprising a plurality of refilling arrangements 116 according to an exemplary embodiment of the invention, which are communicably coupled to a reordering device 123.

In the system shown in FIG. 3, a plurality of refilling arrangements 116 having the features described above are communicably coupled to a node 121 (for example, a gateway). The node 121 is in turn coupled to the reordering device 123 via a communication network 117. If a control device 110 and/or a scale 126 of a refilling arrangement 116 detects that an active ingredient container 114 will soon be empty (for example, because a residual filling of the active ingredient container 114 with active ingredient has fallen below a predetermined threshold value), this information can be transmitted to the reordering device 123 via the node 121 and the communication network 117, which triggers a reordering of a new active ingredient container 114 with the active ingredient.

According to FIG. 3, consumption data regarding active ingredient may be transmitted, for example, to a kanban system. The transmitted data may include an identifier of a respective refilling arrangement 116, an identifier of a dispenser can 104, date and time, and active ingredient and amount of active ingredient consumed and/or reordered. As illustrated, a node 121 may act as a gateway for multiple refilling arrangements 116 in common. Software, and in particular firmware, may be installed on the refilling arrangements 116, the nodes 121, and/or the reordering device 123.

Figures 4, 5, 6, 7, 8:
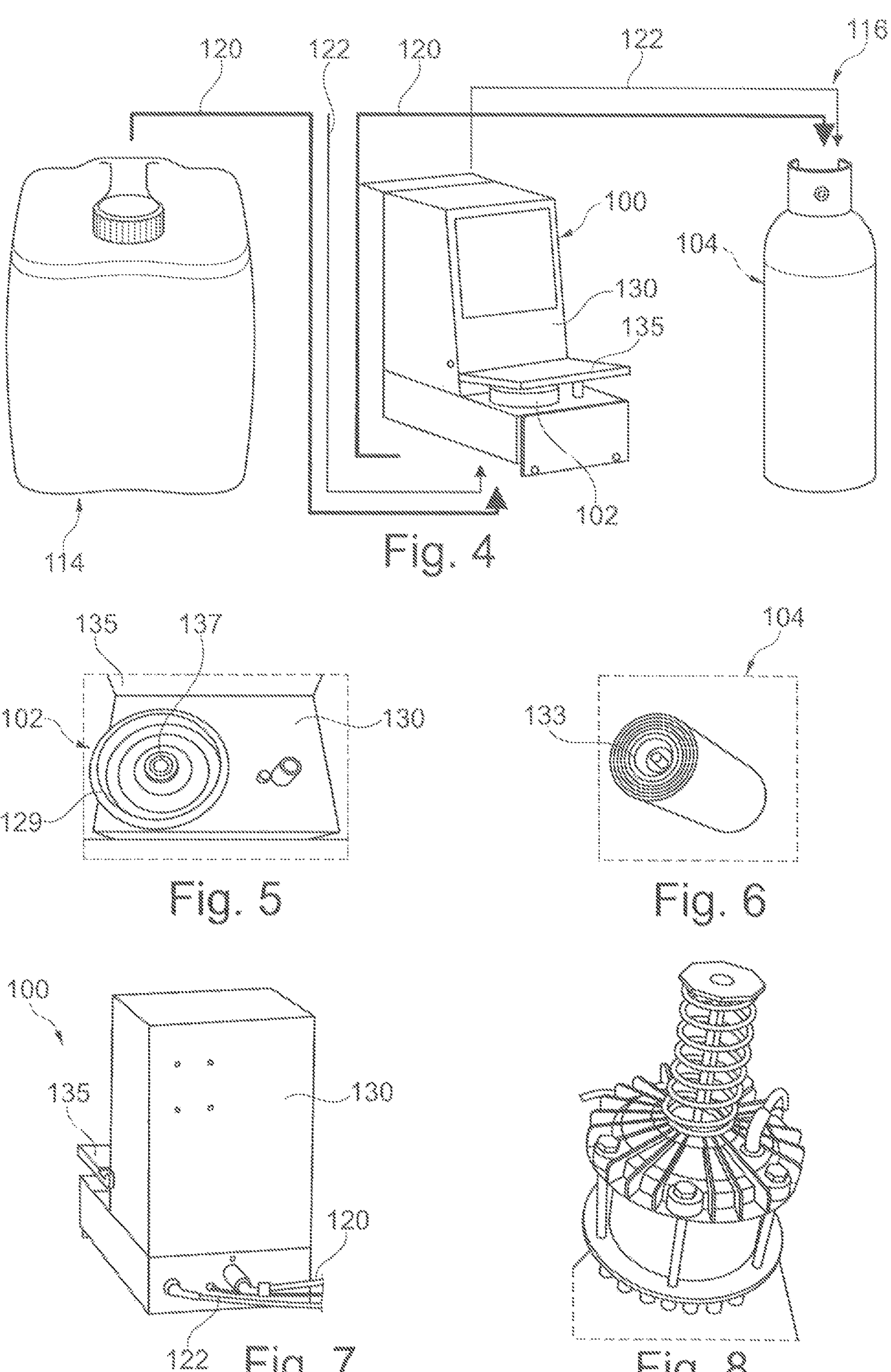
FIG. 4 shows a material flow in a refilling arrangement with a refilling station, an active ingredient container and a dispenser can according to an exemplary embodiment of the invention.
FIG. 5 shows a receiving device of a refilling station according to an exemplary embodiment of the invention.
FIG. 6 shows a bottom of a dispenser can of a refilling arrangement according to an exemplary embodiment of the invention.
FIG. 7 shows a rear side of a refilling station according to an exemplary embodiment of the invention.
FIG. 8 shows a mechanism for refilling a dispenser can in a refilling arrangement according to an exemplary embodiment of the invention.

FIG. 4 shows a flow of material in a refilling arrangement 116 comprising a refilling station 100, an active ingredient container 114, and a dispenser can 104, according to an exemplary embodiment of the invention.

Active ingredient can be transferred from the active ingredient container 114 via a supply device 120 of the refilling station 100 and from there to a dispenser can 104 mounted on a receiving device 102 after a cover 135 has been folded up. Compressed gas may be transferred from a compressed gas reservoir via a supply device 122 of the refilling station 100 and from there to a dispenser can 104 mounted on the receiving device 102. If the dispenser can 104 is a BoV dispenser can, refilling with compressed gas is unnecessary.

FIG. 5 shows a receiving device 102 of a refilling station 100 according to an exemplary embodiment of the invention.

FIG. 6 shows a bottom of a dispenser can 104 of a refilling arrangement 116 to be mounted to the receiving device 102 according to FIG. 5, according to an exemplary embodiment of the invention.

An encoding plate 129 is formed on the receiving device 102 for receiving a bottom portion 133 of the dispenser can 104. The encoding plate 129 is mechanically complementary to the bottom portion 133 of the dispenser can 104 (see FIG. 6). The encoding plate 129 can be exposed by folding up a flap or cover 135 as shown in FIG. 4. A fluid port 137 is shown in a central region of the encoding plate 129, which can be fluidly coupled to a refill valve 162 of the dispenser can 104 to refill active ingredient and/or compressed gas into the dispenser can 104 through the fluid port 137 via the refill valve 162.

After mounting the dispensing can 104 to the encoding plate 129, a locking device may be actuated to lock the dispensing can 104 to the encoding plate 129 to prevent unwanted release of the dispensing can 104 from the receiving device 102 during the refilling process. Upon completion of the refilling process, the dispensing can 104 may be unlocked from the receiving device 102 and removed.

FIG. 7 shows a rear side of a refilling station 100 according to an exemplary embodiment of the invention. In particular, sections of the supply devices 120, 122 are shown in FIG. 7.

FIG. 8 shows a mechanism for refilling a dispenser can 104 in a refilling arrangement 116 according to an exemplary embodiment of the invention. Said mechanism includes a piston and a cylinder of predetermined size so that a fill quantity to be dispensed can be defined by a suitable pressure.

Figures 9, 10, 11, 12:
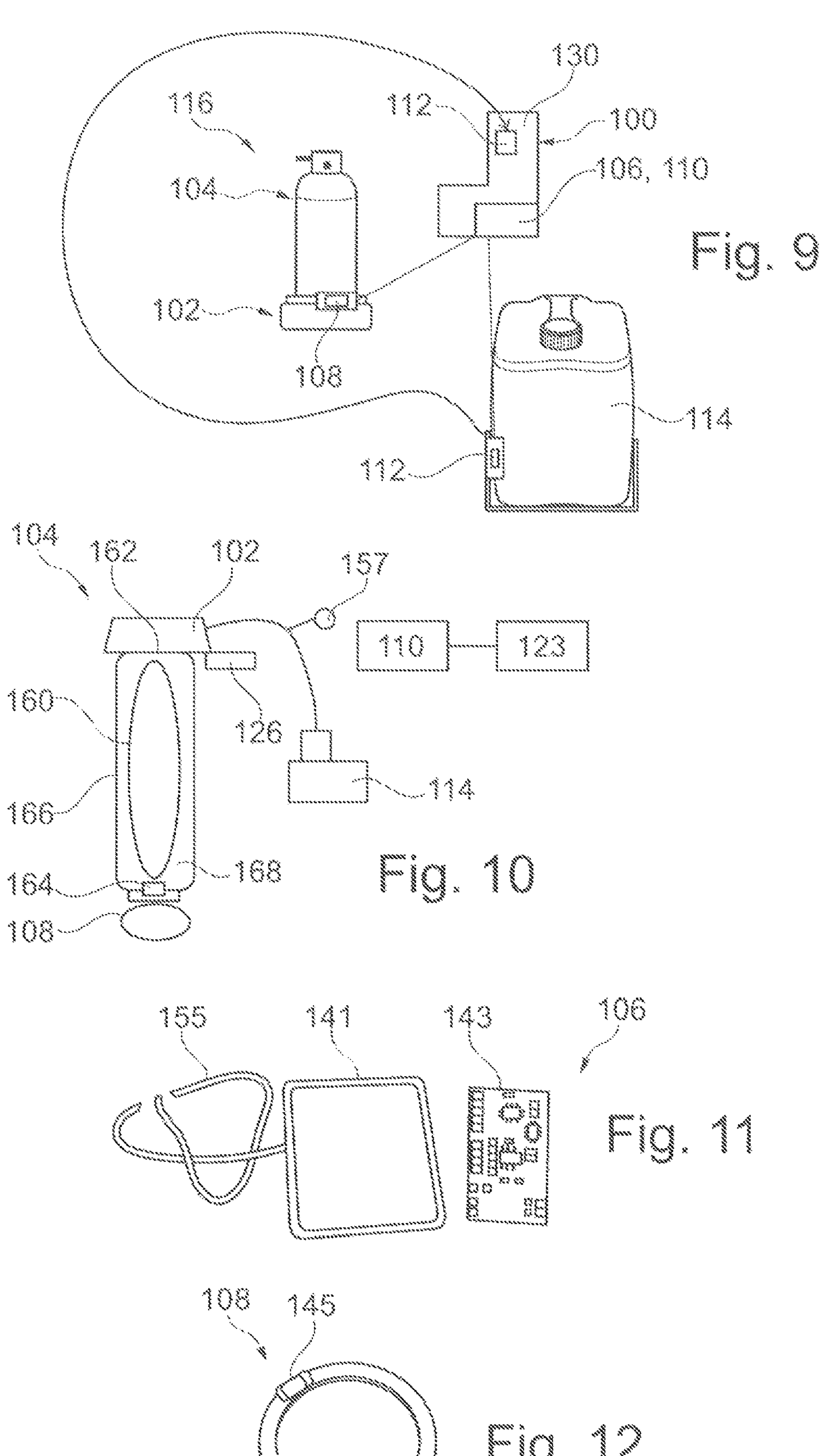
FIG. 9 shows communication links in a refilling arrangement with a refilling station, an active ingredient container and a dispenser can according to an exemplary embodiment of the invention.
FIG. 10 shows a control logic in a refilling arrangement with a refilling station, an active ingredient container and a dispenser can according to an exemplary embodiment of the invention.
FIG. 11 shows components of a transponder reader of a refilling station according to an exemplary embodiment of the invention.
FIG. 12 shows a dispenser can transponder according to an exemplary embodiment of the invention.

FIG. 9 shows communication links in a refilling arrangement 116 comprising a refilling station 100, an active ingredient container 114, and a dispenser can 104 according to an exemplary embodiment of the invention.

Thus, the refilling arrangement 116 shown in FIG. 9 includes the refilling station 100 and the dispenser can 104 attached to the receiving device 102 having a dispenser can transponder 108 that stores dispenser can-related data that is selectively readable by the transponder reader 106 only when the dispenser can 104 is attached to the receiving device 102. Further, the refilling arrangement 116 comprises the active ingredient container 114 that contains active ingredient and is fluidically coupled or couplable to the receiving device 102 to provide active ingredient for refilling the dispenser can 104. As shown, the active ingredient container 114 is provided with and associated with an active ingredient container transponder 112 in which active ingredient container-related data is stored. This is selectively readable by means of the transponder reader 106 only when the active ingredient container transponder 112 has been attached by a user to a housing 130 of the refilling station 100. Preferably, the active ingredient container transponder 112 is formed as an adhesive label that can be detached from the active ingredient container 114 in a defined manner. The dispenser can transponder 108 and the active ingredient container transponder 112 are formed as RFID transponders with an operating frequency of 125 kHz. Accordingly, the transponder reader 106 is configured as an RFID reader with an operating frequency of 125 kHz and a readability distance of 5 cm.

Although not shown in FIG. 9, the refilling arrangement 116 may additionally include, if necessary, a gas reservoir 124 configured to provide compressed gas and fluidically coupled to the receiving device 102 to provide compressed gas for refilling the dispenser can 104 (see FIG. 1 or FIG. 4).

The transponder reader 106 functions to selectively read dispenser can-related data of the dispenser can transponder 108 attached to the dispenser can 104 when the dispenser can 104 is attached to the receiving device 102. Further, the transponder reader 106 functions to read active ingredient container-related data of the active ingredient container transponder 112 attached by a user to a housing 130 of the refilling station 100. Said active ingredient container-related data may include, for example, data identifying the dispenser can 104, data identifying a user of a dispenser can 104, data identifying an active ingredient for refilling into the dispenser can 104, and/or data indicating an amount of active ingredient to be refilled. In contrast, the active ingredient container-related data may comprise data for identifying an active ingredient container 114, data for identifying an active ingredient in the active ingredient container 114, and/or data for indicating a fill amount of active ingredient in the active ingredient container 114.

The control device 110 is configured to control refilling of the dispenser can 104 with the active ingredient based on the read dispenser can-related data and/or based on the read active ingredient container-related data. In particular, the control device 110 is configured to permit refilling of the dispenser can 104 with the active ingredient only if the read dispenser can-related data and the read active ingredient container-related data indicate compatibility of the dispenser can 104 with the active ingredient. Such compatibility is particularly lacking if the dispenser can 104 is not approved to hold that active ingredient, for example, for reasons of operational safety. Compatibility between the active ingredient and the refilling station 100 may also be a condition for performing a desired refill procedure and may be absent, for example, if the active ingredient is considered corrosive to the refilling station.

Advantageously, the transponder reader 106 has a readability distance of at most 5 cm, which suppresses incorrect reading of transponders further away. For the same reason, and additionally for reasons of operational safety, the transponder reader 106 has a power limitation and/or an enclosure that protects against electrostatic discharge at the refilling station 100 or provides ESD protection even in the presence of a flammable agent (such as gasoline).

Although not shown in FIG. 9, the receiving device 102 is coupled to an active ingredient supply device 120 for supplying active ingredient from an active ingredient container 114 into a dispenser can 104 received on the receiving device 102. Further, the receiving device 102 may be coupled, as needed, to a compressed gas supply device 122 for supplying compressed gas from a gas reservoir 124 into a dispenser can 104 received on the receiving device 102.

For example, based on the data read from the transponders 108, 112, the control device 110 can determine a quantity of active ingredient refilled into the dispenser can 104, a number of refilling operations of the dispenser can 104, and/or a residual quantity of active ingredient in the dispenser can 104 prior to a refilling operation and control a subsequent refilling operation to avoid overfilling the dispenser can 104. Advantageously, the control device 110 may be configured to trigger a reorder of an active ingredient container 114 with active ingredient when the control device 110 and/or a scale 126 detects a drop in a residual filling of a currently used active ingredient container 114 with an initial filling of, for example, 20 l below a predetermined threshold value of, for example, 5 l.

FIG. 10 illustrates control logic in a refilling arrangement 116 comprising a refilling station 100, an active ingredient container 114, and a dispenser can 104, according to an exemplary embodiment of the invention.

If the refilling arrangement 116 comprises a scale 126 for detecting a weight (or information indicative thereof) of the dispenser can 104 at the receiving device 102 prior to a refilling operation and/or during a refilling operation, the control device 110 may also be configured to control a refilling of the dispenser can 104 with the active ingredient based on the detected weight or the detected weight information.

Referring to FIG. 10, the dispenser can transponder 108 is located at the outlet valve 164, i.e., opposite the receiving device 102.

Further, according to FIG. 10, the dispenser can 104 is configured as a BoV dispenser can in which a compressed gas remains permanently inside the dispenser can 104 without escaping when the active ingredient is discharged from the dispenser can 104.

In addition, a pressure sensor is shown in FIG. 10 with reference numeral 157.

FIG. 11 shows components of a transponder reader 106 of a refilling station 100 according to an exemplary embodiment of the invention. According to FIG. 11, an RFID antenna 141 is arranged on a filling valve and can be connected by means of an electric cable 155. Associated control electronics are implemented on a printed circuit board 143.

FIG. 12 shows a dispenser can transponder 108 configured as a ring transponder according to an exemplary embodiment of the invention. The dispenser can transponder 108 shown in FIG. 12 may be positioned in the region of a bottom of the dispenser can 104, preferably around a refill valve 162. Reference numeral 145 indicates an associated chip.

Figure 13:
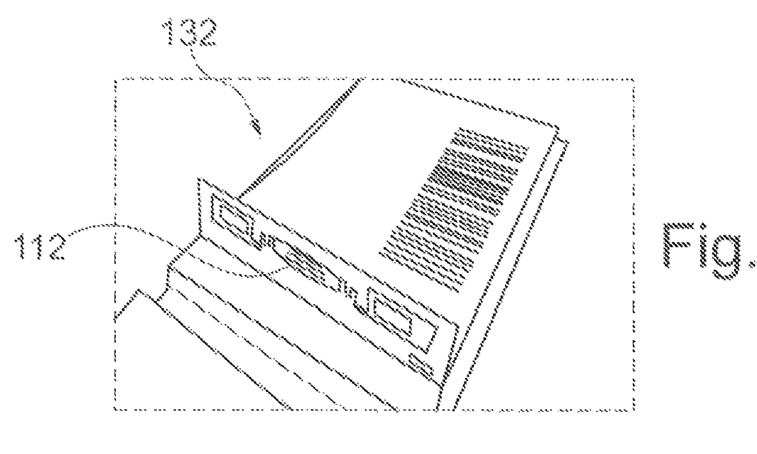
FIG. 13 shows an active ingredient container transponder in the form of a tear-off adhesive label according to an exemplary embodiment of the invention.

FIG. 13 shows an active ingredient container transponder 112 configured as a tear-off adhesive label according to an exemplary embodiment of the invention. In other words, the active ingredient container transponder 112 according to FIG. 13 is an adhesive label for active ingredient identification and is configured, for example, as a peelable or tear-off tag.

Figure 14:
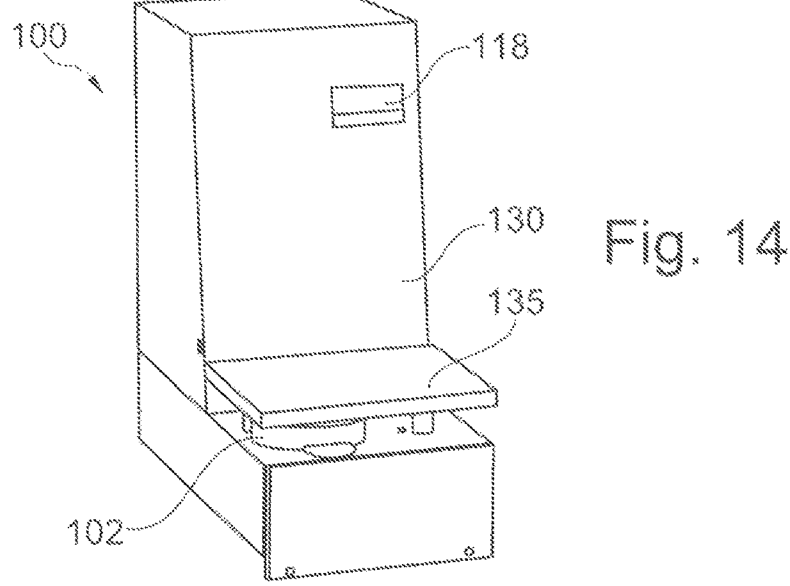
FIG. 14 shows a refilling station with a display device attached to a housing thereof without buttons according to an exemplary embodiment of the invention.

FIG. 14 shows a refilling station 100 with a display device 118 without buttons attached to a housing 130 thereof, according to an exemplary embodiment of the invention.

Figure 15:
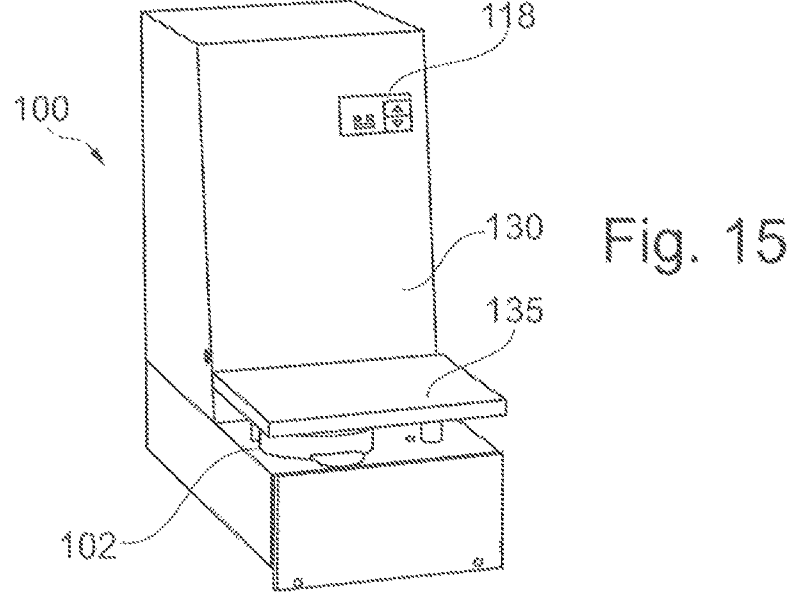
FIG. 15 shows a refilling station with a display device with buttons attached to a housing thereof according to an exemplary embodiment of the invention.

FIG. 15 shows a refilling station 100 having a display device 118 mounted to a housing 130 thereof and having buttons, in accordance with an exemplary embodiment of the invention. The electronic display device 118 is used to display data to a user and additionally allows a user to control an operation of the refilling station 100 in a user-defined manner.

Figure 16:
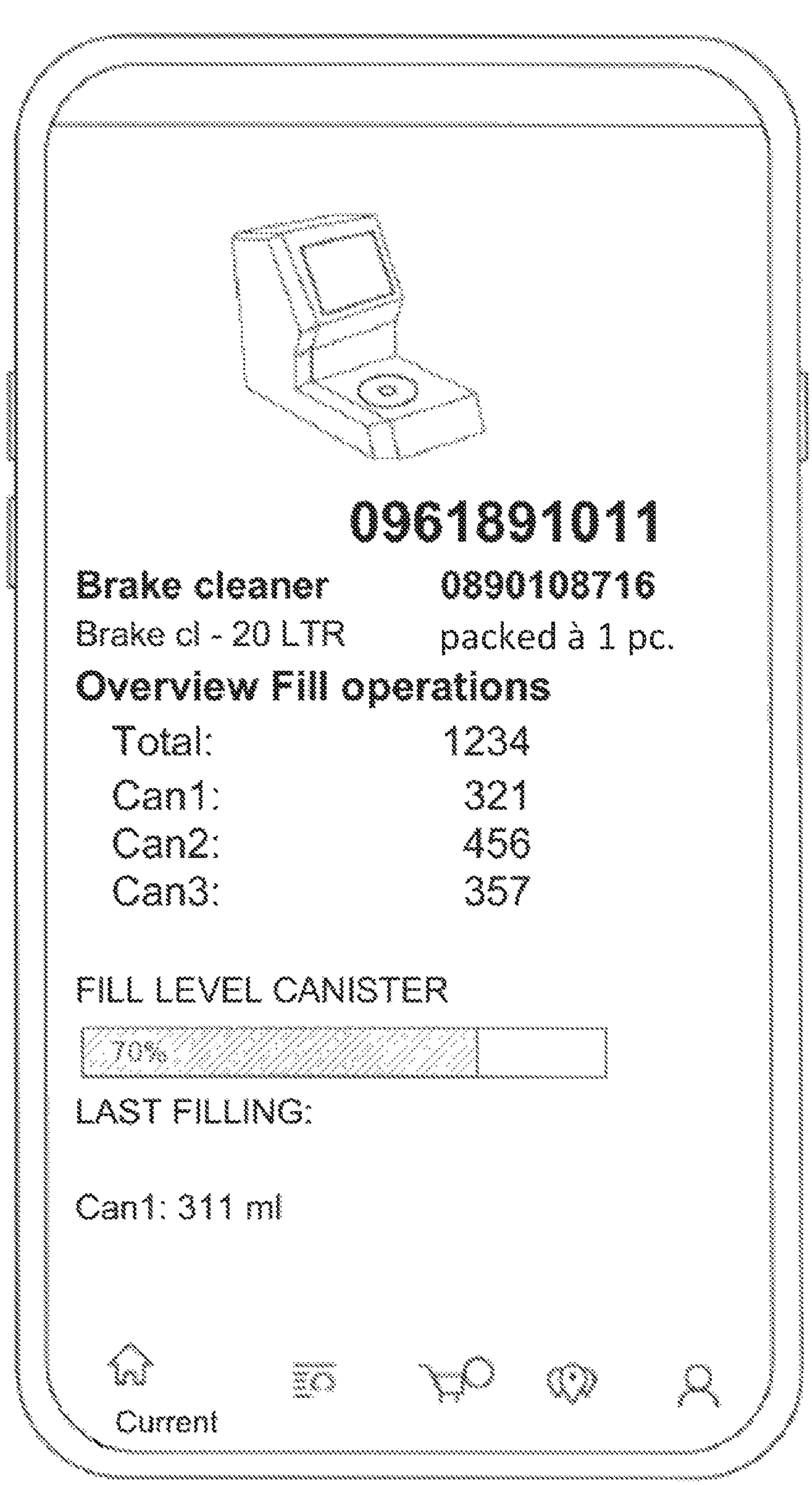
FIG. 16 shows a portable user terminal communicably coupled to a control device of a refilling station according to an exemplary embodiment of the invention.

FIG. 16 shows a portable user terminal 134 communicably coupled to a refilling station 100 according to an exemplary embodiment of the invention. The portable user terminal 134 shown may be, for example, a smartphone. An app may be installed thereon, which may be communicably coupled to the control device 110 thereof for controlling the refilling arrangement 116, for example via a cellular network. Thus, a user can communicate with the refilling station 100, and in particular with its control device 110, by means of his user terminal 134.

Supplementally, it should be noted that "comprising" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as a limitation.

The invention claimed is:

1. Refilling arrangement, comprising:

a refilling station comprising a receiving device for receiving a dispenser can to be refilled with an active ingredient;

a transponder reader for selectively reading dispenser can-related data from a dispenser can transponder attached to the dispenser can when the dispenser can is attached to the receiving device; and a control device for controlling the refilling of the dispenser can with the active ingredient based on the read dispenser can-related data;

wherein the transponder reader has an enclosure that protects against electrostatic discharge at the refilling station even in the presence of a flammable agent; and a dispenser can attachable or mounted to the receiving device and having a dispenser can transponder storing dispenser can-related data selectively readable by the transponder reader when the dispenser can is attached to the receiving device, wherein the dispenser can transponder is configured as a ring transponder and positioned in a region of a bottom of the dispenser can around a refill valve of the dispenser can.

2. Refilling arrangement according to claim 1, comprising an active ingredient container containing active ingredient and coupled or couplable to the receiving device to provide active ingredient for refilling the dispenser can.

3. Refilling arrangement according to claim 2, wherein the active ingredient container is provided with or associated with an active ingredient container transponder in which active ingredient container-related data is stored that can be read out by means of the transponder reader when the active ingredient container transponder is attached to or held in a predetermined area on a housing of the refilling station.

4. Refilling arrangement according to claim 3, wherein the active ingredient container transponder is formed as a label which can be detached from the active ingredient container in a defined manner.

5. Refilling arrangement according to claim 1, wherein the dispenser can transponder and/or the active ingredient container transponder is or are configured as an RFID transponder or as an NFC transponder.

6. Refilling arrangement according to claim 1, comprising a gas reservoir configured to provide compressed gas and coupled or couplable to the receiving device to provide compressed gas for refilling the dispenser can.

7. Refilling arrangement according to claim 1, comprising a portable user terminal having an app communicably coupled to the control device for controlling the refilling arrangement.

8. Method of operating a refilling arrangement according to claim 1, the method comprising:

receiving the dispenser can to be refilled with the active ingredient at the receiving device of the refilling station;

selectively reading dispenser can-related data from the dispenser can transponder by the transponder reader of the refilling station when the dispenser can is attached to the receiving device; and controlling the refilling of the dispenser can with the active ingredient based on the read dispenser can-related data by means of a control device of the refilling station.

* * * * *